(12) United States Patent
Morein

(10) Patent No.: US 6,748,490 B1
(45) Date of Patent: Jun. 8, 2004

(54) METHOD AND APPARATUS FOR MAINTAINING DATA COHERENCY IN A SHARED MEMORY SYSTEM

(75) Inventor: Stephen L. Morein, Cambridge, MA (US)

(73) Assignee: ATI International SRL, Christchurch (BB)

(*) Notice: Subject to any disclaimer, the term of this patent is extended or adjusted under 35 U.S.C. 154(b) by 0 days.

(21) Appl. No.: 09/537,993

(22) Filed: Mar. 29, 2000

(51) Int. Cl.[7] .................................................. G06F 12/08
(52) U.S. Cl. ........................ 711/122; 711/141; 711/156
(58) Field of Search ................................ 711/122, 144, 711/145, 141, 143, 156

(56) References Cited

U.S. PATENT DOCUMENTS

| | | | | |
|---|---|---|---|---|
| 5,584,013 A | * | 12/1996 | Cheong et al. ............. | 711/122 |
| 6,052,775 A | * | 4/2000 | Panwar et al. ............. | 712/215 |
| 6,321,297 B1 | * | 11/2001 | Shamanna et al. .......... | 711/122 |
| 6,345,339 B1 | * | 2/2002 | Arimilli et al. ............ | 711/141 |
| 6,360,301 B1 | * | 3/2002 | Gaither et al. ............. | 711/143 |
| 6,457,101 B1 | * | 9/2002 | Bauman et al. ............. | 711/122 |
| 6,463,507 B1 | * | 10/2002 | Arimilli et al. ............ | 711/122 |
| 6,598,121 B2 | * | 7/2003 | Challenger et al. ......... | 711/122 |

OTHER PUBLICATIONS

"Bit–Map Storage Validation Machine", IBM technical Disclosure Bulletin, vol. 37, No. 6, Page(s) 1–4, Jun. 1994.*
"Residence Group Recording For Multiprocessor Caches", IBM technical Disclosure Bulletin, vol. 36, No. 7, Page(s) 529–530, Jul. 1993.*

* cited by examiner

*Primary Examiner*—Pierre-Michel Bataille
(74) *Attorney, Agent, or Firm*—Vedder, Price, Kaufman & Kammholz, P.C.

(57) ABSTRACT

A method and apparatus for ensuring data coherency in a processing system that includes shared memory is presented. This is accomplished by including a hierarchical validity database within the core logic that interconnects the various memory clients to the memory structure. The hierarchical validity database stores a number of hierarchical levels, where each level pertains to different sized portions of the memory. Validity of a portion, or block, within the memory can be determined by referencing the hierarchical validity database.

29 Claims, 4 Drawing Sheets

METHOD AND APPARATUS FOR MAINTAINING DATA COHERENCY IN A SHARED MEMORY SYSTEM

FIELD OF THE INVENTION

The invention relates generally to data processing systems, and more particularly to a method and apparatus for maintaining data coherency in processing systems that include shared memory structures.

BACKGROUND OF THE INVENTION

As computing systems continue to evolve, multiple processing entities often reside within the same computing system. These multiple entities may share memory structures such that data can easily be utilized by the multiple processing entities and such that the costs associated with including memory in the system are reduced. In some processing systems, processors may include localized memory such as caches in which they store small portions of the data included in the shared memory structure for faster and more efficient access. In such systems, data coherency issues can arise when the processing entity updates data in the localized memory without immediately updating the corresponding data in the shared memory structure.

Processing systems that include multiple processing entities typically include core logic, or glue logic, that serves to interface multiple bus structures, processors, memories, and other portions of the system that must work together. In such systems, the core logic block may be responsible for maintaining data coherency within the processing system. This is true in the case where a Peripheral Component Interconnect (PCI) bus is used to couple input/output devices or other processing entities to the core logic. In such systems, when the core logic receives a read request corresponding to a shared memory structure from a device coupled to the PCI bus, the address included with the read request is provided to the memory in order to fetch the data corresponding to the address. The address is also provided to any processors that may store a more current or modified version of the data such that those processors may flush their cache structures so that the memory will store the most current version of the data. If the processing entities that are queried to determine if they store more current version do not store a more current version, the core logic must be informed that a more current version does not exist outside of the memory structure. This is problematic in that each memory request over the PCI bus will force an access to each of the processors that may store more current versions of the data. This burdens the interfaces between the processors and the core logic and may also increase the bandwidth usage on the interface between the processor and the memory. Both of these effects starve the processor of valuable memory bandwidth that it needs in order to perform its processing functions.

Similar problems arise when an Accelerated Graphics Port (AGP) bus is used to couple an input/output device or other processing entity to the core logic. In such systems, the processor that may store a more current version of data than what is present in memory is typically responsible for ensuring that data coherency is maintained when memory requests are received over the AGP bus. The overhead required to maintain this coherency may be significant, and, as such, may interfere with the capability of the processor to efficiently perform the processing functions that it is required to implement. As such, the data coherency concerns can affect the overall processing system performance.

Therefore, a need exists for a method and apparatus for maintaining data coherency within a processing system that includes shared memory where the data coherency maintenance requires reduced interface bandwidth usage and reduced attention by processors or other entities included within the system.

DETAILED DESCRIPTION OF A PREFERRED EMBODIMENT OF THE INVENTION

Generally, the present invention provides a method and apparatus for ensuring data coherency in a processing system that includes shared memory. This is accomplished by including a hierarchical validity database within the core logic that interconnects the various memory clients to the memory structure. The hierarchical validity database stores a number of hierarchical levels, where each level pertains to different sized portions of the memory. Validity of a portion, or block, within the memory can be determined by referencing the hierarchical validity database. As such, cache coherency queries to processors or other memory clients in the system may be greatly reduced, thus freeing bus and processing bandwidth for other operations.

Figure 1:
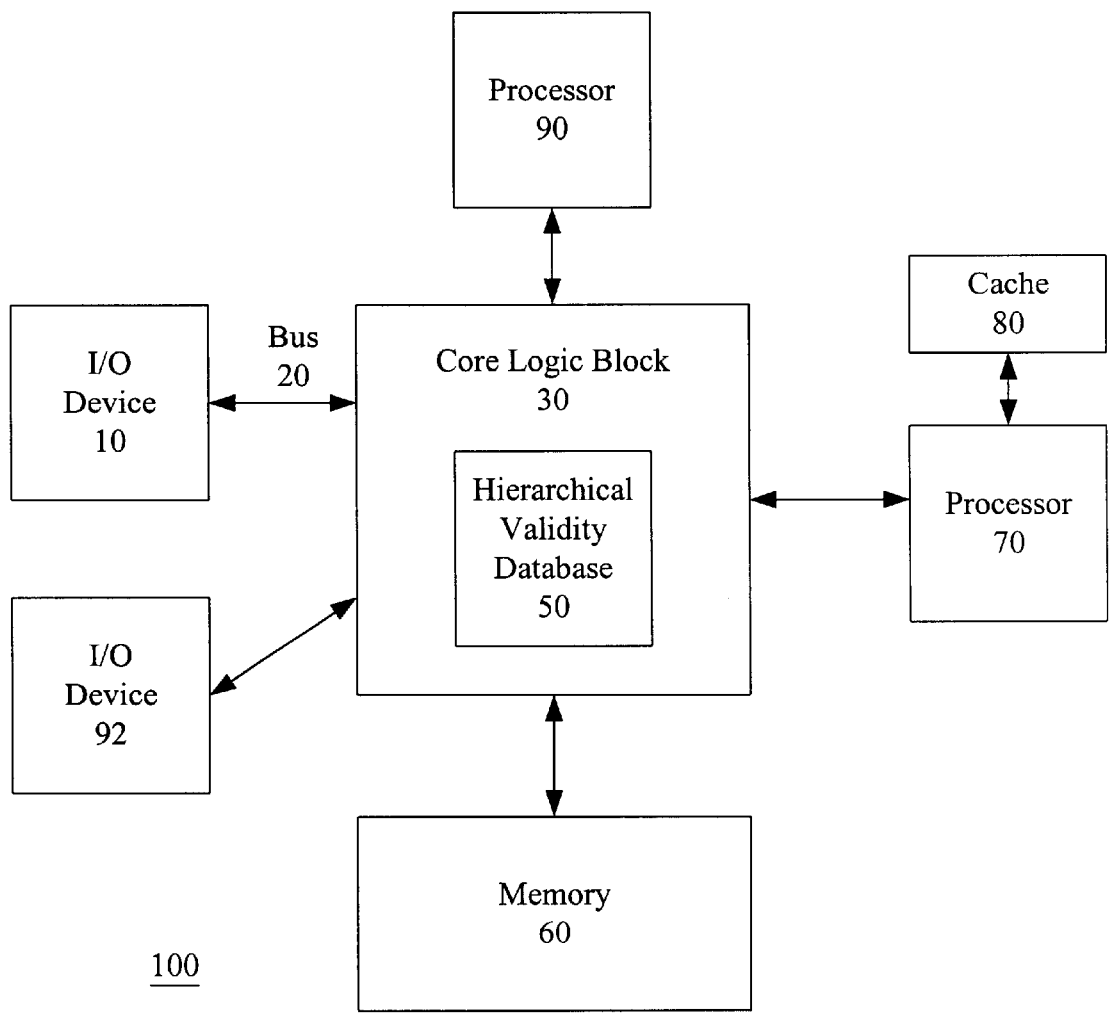
FIG. 1 illustrates a block diagram of a processing circuit that includes shared memory in accordance with a particular embodiment of the present invention.

The invention can be better understood with reference to FIGS. 1–5. FIG. 1 illustrates a block diagram of a processing circuit 100 that includes a memory 60 and a core logic bock 30. The core logic block 30 is shown to include a hierarchical validity database 50 which can be consulted to determine if data stored in various portions of the memory 60 is valid in terms of its coherency. The memory 60 stores data corresponding to a memory address space used within the processing circuit 100. The memory 60 is accessed using memory addresses that correspond to the memory address space. Access to the memory 60 is controlled via the core logic block 30 to which the memory 60 is operably coupled.

The core logic block 30 is operably coupled to receive memory access requests from a plurality of memory clients. FIG. 1 illustrates a number of example memory clients that may be present in such a processing system. These include processors 70 and 90, and input/output (I/O) devices 10 and 92. Each of the plurality of memory clients may access data stored within the memory 60 by interfacing with the core logic block 30. In some cases, the memory client may include localized memory, such as the cache 80 coupled to the processor 70, such that a copy of the data retrieved from memory 60 may be stored locally for more efficient processing. As stated earlier, problems can arise when locally stored data differs from corresponding data stored in the memory 60. For example, if the processor 70 retrieves a block of data from the memory 60 and temporarily stores it in its cache 80 for efficient processing and modifies this data without updating the memory 60, the copy of the data stored within the memory 60 will be invalid with respect to its potential use by other memory clients.

In prior art systems, either the core logic block 30 or the entity which stored the localized version of the data, such as the processor 70, was responsible for maintaining data coherency, which ensures that data retrieved from the memory 60 is the most current copy of that data within the processing circuit 100. Such data coherency management in prior art systems typically reduced the available bandwidth both for processing operations and for data transmission across the bus structures within the processing system.

The present invention includes a hierarchical validity database 50 within the core logic block 30 that can be consulted to quickly determine validity of certain portions of the memory 60 in terms of its coherency. The hierarchical validity database 50 is regularly updated by the core logic block based on at least a portion of the memory accesses that affect data coherency within the memory 60. In other words, if the processor 70 issues an invalidate command to the core logic block 30 indicating that it has modified data that it is currently processing using its cache 80, the core logic block 30 can ensure that the hierarchical validity database reflects the lack of guaranteed coherency of the copy of that data stored in the memory 60.

Thus, when the core logic block 30 receives a memory access request such as a read request, the hierarchical validity database 50 can be consulted to insure data coherency for the memory access requests. If the hierarchical validity database 50 provides a positive indication that the data within the memory 60 is a coherent copy, thus indicating it is the most current copy within the processing system, the memory access request can be allowed to proceed.

Each of the plurality of memory clients supported by the core logic block 30 that share the memory 60 may issue a portion of the memory access requests that are received by the core logic block. In one embodiment, one of the memory clients is a processor such as the processor 70 that includes a cache structure 80 that renders at least a portion of the data within the memory effectively invalid. Thus, if the processor 90, which may be a secondary processor, wishes to access the data that has been rendered invalid by the processor 70 storing a more current version in its cache 80, the core logic block 30 determines via the hierarchical validity database that the particular data within the memory 60 which the processor 90 wishes to access may not be valid. In one embodiment, the hierarchical validity database 50 provides positive indications of validity, but cannot necessarily confirm invalidity. If the validity of the data cannot be confirmed, the core logic block 30 issues a cache coherency query to the processor 70 which responds by indicating whether or not it stores a more current copy of the requested data than that which is currently present within the memory 60.

In another embodiment, the I/O device 10 which is coupled to the core logic block 30 via a bus 20 may require certain data from a specific address or block in the memory 60 in a similar manner to that of the secondary processor 90. As such, the core logic block 30 consults the hierarchical validity database 50 in order to determine if validity of the data (coherency), is ensured based on what is indicated in the hierarchical validity database 50. If validity is ensured based on what is stored in the hierarchical validity database 50, the memory access request received from the I/O device 10 is allowed to proceed without the need for any query being issued to other memory clients.

In an embodiment where an I/O device 10 is included within the processing system 100, the bus that couples the I/O device 10 to the core logic block 30 may be a PCI bus or an AGP bus. The requirements for ensuring memory coherency in prior art systems that include PCI and AGP buses is described above. Embodiments of the present invention avoid the majority of the overhead associated with ensuring data coherency within the processing circuit 100 by utilizing the hierarchical validity database 50 within the core logic block 30. As such, if the bus 20 is an AGP bus, it can operate as a cache coherent AGP bus such that the processor 70 need not be concerned with the required maintenance of data coherency within the processing system 100. Note that multiple I/O devices or similar memory clients may be coupled to the core logic block 30 via bus structures of different types. For example, in one embodiment a first I/O device may be coupled to the core logic block 30 via a PCI bus while a second I/O device is coupled to the core logic block 30 via an AGP bus, where both I/O devices benefit from the data coherency support provided by the hierarchical validity database.

Figure 2:
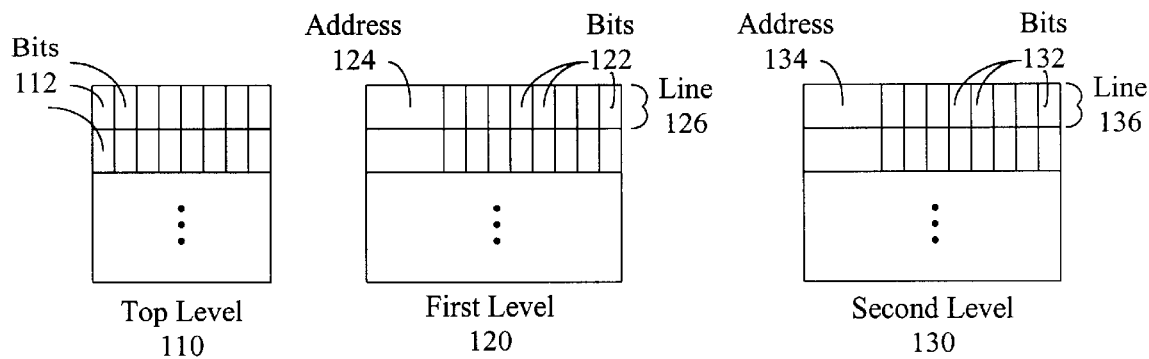
FIG. 2 illustrates a block diagram of a hierarchical validity database in accordance with a particular embodiment of the present invention.

FIG. 2 illustrates a block diagram of a hierarchical validity database 50 in accordance with a particular embodiment of the present invention. Although the hierarchical validity database 50 of FIG. 2 is shown to include a top level 110, a first level 120, and a second level 130, hierarchical validity databases in other embodiments of the present invention may only include the first and second levels 120 and 130 or even more levels may be included. Each of the levels within the hierarchical validity database 50 may be implemented as an independent memory structure, such as a cache. In an embodiment that is described in more detail with respect to FIG. 4 below, each level is implemented using a primary cache structure and a secondary cache structure.

Figure 3:
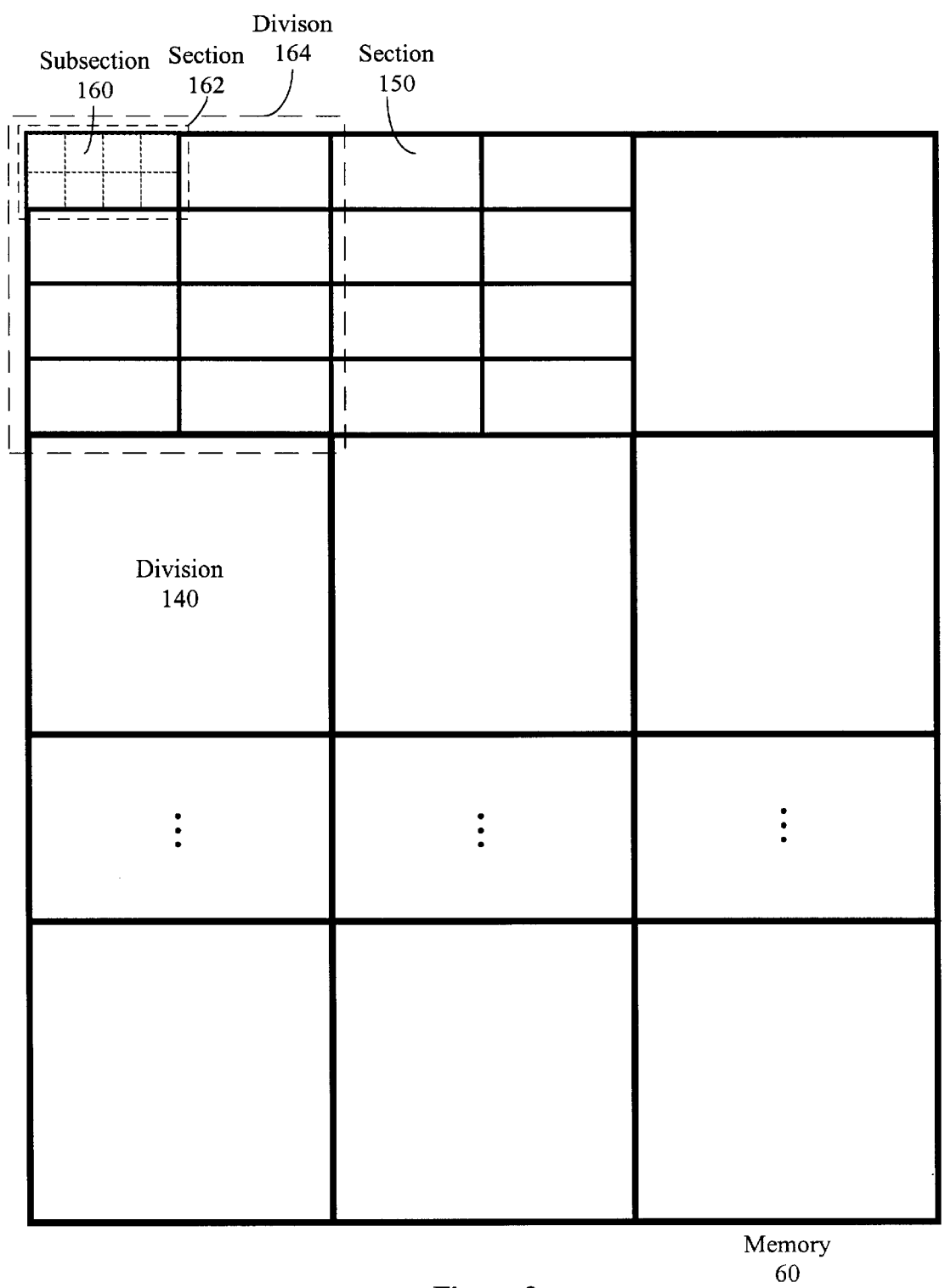
FIG. 3 illustrates the subdivision of a memory structure in accordance with a particular embodiment of the present invention.

FIG. 3 illustrates a simplified block diagram of a memory 60 that has been divided into a plurality of divisions. The division is the largest sized portion into which the memory 60 has been divided. Each division of the memory 60 is further divided into a plurality of sections such as the section 150. In the example memory 60 shown in FIG. 3, each division is shown to include 8 sections. Thus, in the simplified example of FIG. 3, the entire memory 60 can be divided into 48 sections.

A further division of each of the sections produces a plurality of subsections such as the subsection 160. As is shown in the example memory 60 of FIG. 3, each section has been divided into eight subsections. It is stressed that the simplification of the memory 60 in FIG. 3 has been performed to aid in understanding the teachings of the present invention, and the number of subsections, sections, and divisions that a particular memory structure can be divided into will vary based on the particular processing system within which the memory is included.

Referring back to FIG. 2, the second level 130 stores a plurality of lines such as the line 136. Each line of the plurality of lines in the second level corresponds to a section of the memory 60. For example, the line 136 may correspond to the section 162 within which the subsection 160 is included. Each line within the plurality of lines in the second level 130 includes a plurality of bits and a section address. The section address indicates to which section of the memory the particular line corresponds. Each bit included in each line within the second level indicates validity of a particular subsection included in the section to which the particular line corresponds.

Thus, assuming that the line 136 corresponds to the section 162 within which the subsection 160 is included, the address 134 would specify the base address for the section 162. Each of the bits included in the line 136, such as the bits 132, would correspond to a particular subsection within the section 162. In one embodiment, a set bit (logic one) would indicate valid data within a particular subsection. A cleared bit (logic zero) would indicate that no validity is assured for that particular subsection, and a cache coherency query must be issued prior to providing data included in that subsection to a memory client. Note that in other embodiments, cleared bits may be used to indicate valid data, whereas set bits may be used to indicate data that is not assured of validity.

The first level 120 is structured in a similar manner to the second level 130. The first level 120 includes a plurality of lines where each of the plurality of lines in the first level corresponds to a division of the memory 60. Each line within the plurality of lines in the first level includes a plurality of bits and a division address. The division address indicates to which division of the memory the line corresponds, and each bit included in each line within the first level indicates validity of a particular section within the division to which the line corresponds.

Thus, for example, the line 126 included within the first level 120 may correspond to the division 164. As such, the address 124 would provide the base address for the division 164 such that the various sections included within the division 164 can be located within the memory address space. Each of the bits included in the line 126, such as the bits 122, indicates validity of a particular section within the division 164. Thus, one of the bits 122 may indicate whether or not all of the data included within the section 162 is assured of being valid. As such, each bit within a line at the first level 120 indicates validity of a portion of the memory 60 that is equivalent to the portion for which validity is signified by an entire line within the second level 130.

Inclusion of a top level 110 within the hierarchical validity database 50 allows for efficient validity checking of a large portion of the memory 60. The top level 110 includes a plurality of bits such as the bits 112, where each bit of the plurality of bits included in the top level indicates validity of a corresponding division of the memory 60. Therefore, for every division included within the memory 60, a corresponding bit is included in the top level 110. Because of the one-to-one correspondence between bits at the top level 110 and divisions within the memory 60, no addresses are required within the top level 110 to determine to which division a particular bit corresponds. The position of the bit within the bit array in the top level 110 is used to determine to which division the particular bit corresponds. For example, the first bit within the array may correspond to the division 164.

It should be noted that although the top level 110 includes a specific bit for each division within the memory 60, the first and second levels 120 and 130 do not necessarily contain a particular bit corresponding to each and every section and subsection included within the memory 60. For example, if the top level 110 indicates that an entire division is valid, there is no need to store similar indications of validity for all of the sections and subsections included within that division using the first and second levels 120 and 130. Similarly, if the first level 120 indicates that an entire section is valid, there is no need for the second level 130 to redundantly provide validity indications for each of the subsections included within that valid section.

In an example embodiment, each subsection may be equal to a 32-byte portion of the memory. If a line within the second level 130 stores an address and 64 bits, the line provides validity indications for a total of 64 32-byte blocks. This is equivalent to the size of a section, which includes 2048 bytes. If each line at the first level 120 also includes 64 bits, a line at the first level 120 corresponds to a block 128 K bytes. In the example provided, this is equivalent to a division within the memory 60. Thus, in the example, each bit included in the top level 110 corresponds to a 128 K byte block.

When a memory access request is received, and validity of the data within the memory must be confirmed, the address can be used to determine the particular division within which the data to be verified is located. Based on this, the corresponding bit for that division within the top level 110 can be examined to determine if there is validity assurance for the entire division. If the bit indicates that the entire division stores valid data, the memory access request can be serviced without the need for any data coherency queries being issued.

If the bit at the top level 110 indicates that there is no assurance that all of the data within the division is valid, the first level 120 may be consulted to determine if it contains such an assurance of validity for the section in which the data is included. The address for the data to be retrieved is used to index amongst the plurality of lines included in the first level 120. If a matching address is determined, the line associated with that address is indexed to find the bit corresponding to the particular section within which the data to be retrieved is included. If this bit indicates that the entire section is valid, the memory access request can be serviced without data coherency queries being issued. If the bit does not indicate that the entire section is valid, the second level 130 can be consulted.

Note that even though the top level 110 does not assure validity of a division within which the desired data is included, there is no requirement that the first level 120 store an address that corresponds to the particular division that is potentially at least partially invalid. This is because the size of the memory structures that store the first and second levels 120 and 130 may be limited such that a one-to-one correspondence does not exist between all of the bits included in the first level 120 and all of the sections included in the memory 60. Similarly, there may not be nor a one-to-one correspondence between all of the bits included in the second level 130 and all of the subsections included within the memory 60.

When the second level 130 is consulted to see if validity of the data can be determined, the address for the data is used to index amongst the addresses for the various lines included within the second level 130. Further indexing is performed on a line with a matching address to determine the particular bit corresponding to the subsection within which the desired data is included. This bit can then be checked to determine if it assures validity of all of the data within that subsection. If no validity assurance is indicated, a data coherency query must be issued. If data validity is assured, the memory access request can proceed without such queries being issued.

When the hierarchical validity database 50 must be updated to reflect the assurance or lack of assurance of validity of a particular set of data within the memory 60, each of the various levels included in the hierarchical validity database 50 must be considered. For example, if a write command is issued to the memory from a memory client such as a processor, this will confirm that the data written is the most current copy of the data within the processing system. As such, the hierarchical validity database may have to be updated. This can be accomplished by first checking the top level 110 to determine if the division to which the particular data has been written is already indicated as valid. If so, the write can occur with no updating required. If the top level bit indicates that the division includes at least some portions which are not assured of being valid, which may be indicated by a cleared bit as described earlier, the first level must be checked.

The address of the data being written to the memory is used to index within the first level to determine if there is a particular bit corresponding to the section within which the data is being written. If such a bit is present within the first level 120 and it indicates that the data within that section is valid, no updating is required. If the bit does not indicate validity at the first level 120, the second level 130 must be consulted.

Once again, the address used to write the data to the memory 60 is used to index within the second level 130 to determine if there is a bit corresponding to the particular subsection in which the data is being written. If such a bit exists and it indicates that the data within that subsection is valid, the write can occur with no update to the hierarchical validity database 50. If the bit indicates that there is no guarantee of such validity, this bit must be updated to reflect the new valid state of the data within the memory.

If a bit within the second level 130 is updated to reflect validity, the line may be inspected to determine if it indicates that all of the subsections within the section to which the line corresponds are now valid. If this is the case, the update may propagate to the first level such that the bit within the first level corresponding to the section that is now entirely valid is updated to indicate such validity. As is apparent to one of ordinary skill in the art, this validity propagation could continue to the top level 110 if the entire division within which the data is stored is now valid.

In some cases, no line may exist in the first or second level 120 and 130 corresponding to the location within the memory where the data is being written. In such cases, a new cache line may be created to indicate the data that has just been written is now valid. Because the size of the first level 120 and the size of the second level are limited, and the levels may not store lines corresponding to all of the various portions of the memory 60, the creation of a new line to reflect new validity may require an existing line within the first and/or second level to be removed. Such a level may be removed based on a number of factors. One determination maybe made based on the line least recently used to perform a validity determination. Another may be based on the line that includes the fewest number of valid indications. In some embodiments, different portions of the first level 120 and the second level 130 may be allocated to different portions of the memory 60. For example, half of the available lines in the first level 120 may be allocated to half of the memory structure 60. Such delineation of the lines in the levels may influence which lines are chosen for discarding when new lines are to be created.

Note that any of the memory clients may be capable of issuing an invalid indication to the core logic block 30 that would require the hierarchical validity database 50 to be updated to reflect this new state of invalidity. In the case of updating to reflect invalidity rather than validity, the sequence of checking bits and updating begins at the second level 130. The second level 130 is examined to determine if there is a bit within one of the lines that corresponds to the particular address for which the data is being invalidated. If this bit exists and indicates invalid data, no updating is required. If it indicates that the data is valid, the bit should be cleared, or set to a state to indicate the invalidity of the data within the memory. Similar examinations of bits that may be present in the first level 120 and the top level 110 must be performed, and if valid indications are stored that correspond to the section or division within which the newly invalidated address is included exists, theses bits should be modified to reflect this invalidity.

Figure 4:
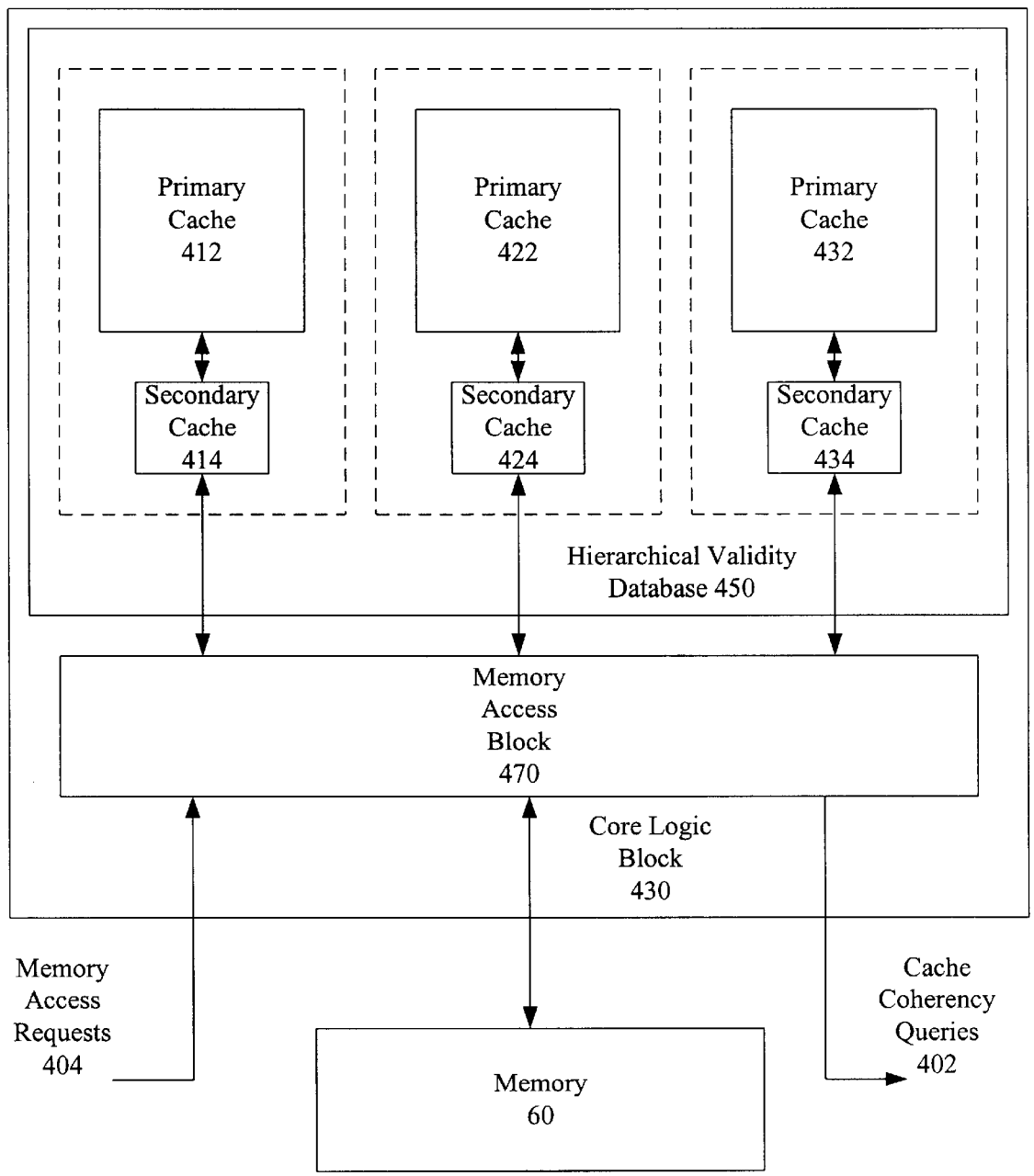
FIG. 4 illustrates a block diagram of a core logic block as it is coupled to memory in accordance with a particular embodiment of the present invention.

FIG. 4 illustrates a block diagram of a core logic block 430 coupled to the memory 60. The core logic block 430 includes a memory access block 470 and a hierarchical validity database 450. The hierarchical validity database 450 includes at least a first level 420 and a second level 430, and may also include a top level 410, where these levels are similar to those described above with respect to FIG. 2. However, as is illustrated in FIG. 4, each of the levels is implemented using a primary cache and a secondary cache. Thus, the top level 410 is implemented using a primary cache 412, which stores the entire array of bits for the top level 410, as well as a secondary cache 414 that may be used to cache portions of the data stored within the primary cache 412 for more efficient access by the memory access block 470. Similarly, the first level 420 includes a primary cache 422 and a secondary cache 424, and the second level 430 includes a primary cache 432 and a secondary cache 434. Note that the sizes of each of the primary and secondary caches corresponding to each of the various levels may be varied to suit the needs of the particular system. The cache structures 412–434 may be included on an integrated circuit with the remainder of the core logic block, or may be implemented using one or more discrete memory structures.

The memory access block 470 receives the memory access requests 404 that may include read requests, write requests, and invalidate instructions, some of which are used to update the hierarchical validity database 450. The memory access block 470 receives the memory access requests 404 corresponding to read operations and determines whether or not the data within the memory 60 corresponding to the memory access request is assured of being valid or not. If validity is assured, the access request is allowed to proceed without the generation of a cache coherency query 402. However, if the hierarchical validity database 450 indicates that the specific portion of memory is not assured of being valid, a cache coherency query 402 will be generated by the memory access block 470 such that the processor or other memory client that may store a more current version of the data will respond with an indication as to whether more current data than that stored in the memory 60 is available.

Figure 5:
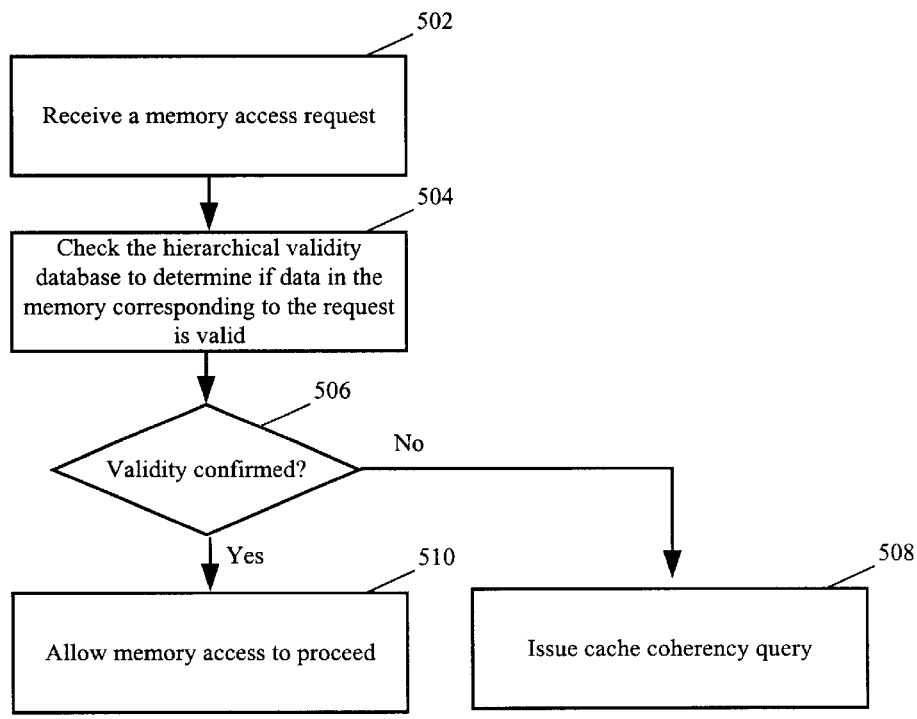
FIG. 5 illustrates a flow diagram of a method for maintaining data coherency in a processing system with shared memory in accordance with a particular embodiment of the present invention.

FIG. 5 illustrates a flow diagram of a method for processing memory access requests that are received utilizing a hierarchical validity database such as those described herein. The method begins at step 502 where a memory access request is received. The memory access request includes an accompanying address, and preferably corresponds to a memory read request. At step 504, the hierarchical validity database is checked to determine if the data corresponding to the address is assured of being valid (coherent) as stored in the memory.

If it is determined at step 506 that the validity has not been confirmed, the method proceeds to step 508 where at least one cache coherency query is issued to at least one of the memory clients that may store a more current version of the data. Such a memory client may respond with either an indication that it does not store a more current version of the data that is present in memory, or an indication that it does store a more current version, which may come in the form of data being flushed from a cache corresponding to that memory client.

If it is determined at step 506 that the validity of the data in memory is confirmed based on the hierarchical validity database, the method proceeds to step 510. At step 510, the memory access corresponding to the memory access request is allowed to proceed such that data stored in the memory corresponding to the address may be retrieved and provided to the memory client that issued the memory access request. Note that this step is performed without the need for any cache coherency queries, thus reducing the bandwidth over the interface to the potential recipients of such cache coherency queries with respect to that required to insure data validity, or coherency, in prior art system.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A processing circuit, comprising:
   memory that stores data corresponding to a memory address space wherein the memory is accessed using memory addresses that correspond to the memory address space; and
   a core logic block that is operably coupled to the memory, wherein the core logic block receives memory access requests from a plurality of memory clients, wherein the core logic block includes hierarchical validity database that stores indications as to data validity within the memory, wherein the core logic block updates the hierarchical validity database based on at least a portion of memory accesses that affect data coherency within the memory, wherein the core logic block consults the hierarchical validity database to ensure data coherency for memory access requests corresponding to memory read operations.

2. The processing circuit of claim 1, wherein the plurality of memory clients further comprises a processor operably coupled to the core logic block, wherein the processor initiates a first portion of the memory access requests received by the core logic block.

3. The processing circuit of claim 2 further comprises a cache operably coupled to the processor, wherein the cache stores data corresponding to memory addresses within the memory address space, wherein at least a portion of the data stored in the cache renders corresponding data in the memory invalid.

4. The processing circuit of claim 3, wherein the plurality of memory clients further comprises a secondary processor operably coupled to the core logic block, wherein the secondary processor initiates a second portion of the memory access requests received by the core logic block.

5. The processing circuit of claim 3, wherein the plurality of memory clients further comprises an input/output device operably coupled to the core logic block via a bus, wherein the input/output device initiates a second portion of the memory access requests received by the core logic block.

6. The processing circuit of claim 5, wherein the bus is a Peripheral Component Interconnect (PCI) bus.

7. The processing circuit of claim 5, wherein the bus is an Accelerated Graphics Port (AGP) bus.

8. The processing circuit of claim 7, wherein the Accelerated Graphics Port (AGP) bus is a cache coherent Accelerated Graphics Port (AGP) bus.

9. The processing circuit of claim 1, wherein the hierarchical validity database further comprises:
   a first level, wherein the first level stores a plurality of lines, wherein each line of the plurality of lines in the first level corresponds to a division of the memory, wherein each line of the plurality of lines in the first level includes a plurality of bits and a division address, wherein the division address indicates to which division of the memory the line corresponds, wherein each bit included in each line within the first level indicates validity of a section of the division to which the line corresponds; and
   a second level, wherein the second level stores a plurality of lines, wherein each line of the plurality of lines in the second level corresponds to a section of the memory, wherein each line of the plurality of lines in the second level includes a plurality of bits and a section address, wherein the section address indicates to which section of the memory the line corresponds, wherein each bit included in each line within the second level indicates validity of a subsection of the section to which the line corresponds.

10. The processing circuit of claim 9, wherein the hierarchical validity database includes a top level, wherein the top level includes a plurality of bits, wherein each bit of the plurality of bits included in the top level indicates validity of a corresponding division of the memory, wherein each division of the memory includes a plurality of sections of the memory.

11. The processing circuit of claim 10, wherein each level of the hierarchical validity database is stored in a corresponding cache structure within the core logic block.

12. The processing circuit of claim 11, wherein each cache structure within the core logic block includes a primary cache and a second cache, wherein the secondary cache stores a portion of data stored in the primary cache.

13. The processing circuit of claim 1, wherein the core logic block sets invalid indications in the hierarchical validity database based on invalidate commands received from one of the plurality of clients.

14. The processing circuit of claim 1, wherein the core logic block sets invalid indications in the hierarchical validity database based on write operations performed by at least one of the plurality of clients.

15. The processing circuit of claim 1, wherein the core logic block provides a cache coherency query to at least one of the plurality of clients based on an unsuccessful validation using the hierarchical validity database.

16. The processing circuit of claim 1, wherein the core logic block allows read operations to proceed without a cache coherency query when validity of data is determined by a successful validation using the hierarchical validity database.

17. A processing circuit, comprising:
memory that stores data corresponding to a memory address space wherein the memory is accessed using memory addresses that correspond to the memory address space; and
a core logic block that is operably coupled to the memory, wherein the core logic block receives memory access requests from a plurality of memory clients, wherein the core logic block includes hierarchical validity database that stores indications as to data validity within the memory, wherein the core logic block updates the hierarchical validity database based on at least a portion of memory accesses that affect data coherency within the memory, wherein the core logic block consults the hierarchical validity database, and provides an indication as to data validity within the memory to ensure data coherency in response to memory access requests corresponding to memory read operations from at least one memory client.

18. The processing circuit of claim 17, wherein the plurality of memory clients further comprises a processor operably coupled to the core logic block, wherein the processor initiates a first portion of the memory access requests received by the core logic block.

19. A core logic block, comprising:
a hierarchical validity database, wherein the hierarchical validity database includes:
a first level, wherein the first level stores a plurality of lines, wherein each line of the plurality of lines in the first level corresponds to a division of a memory, wherein each line of the plurality of lines in the first level includes a plurality of bits and a division address, wherein the division address indicates to which division of the memory the line corresponds, wherein each bit included in each line within the first level indicates validity of a section of the division to which the line corresponds; and
a second level, wherein the second level stores a plurality of lines, wherein each line of the plurality of lines in the second level corresponds to a section of the memory, wherein each line of the plurality of lines in the second level includes a plurality of bits and a section address, wherein the section address indicates to which section of the memory the line corresponds, wherein each bit included in each line within the second level indicates validity of a subsection of the section to which the line corresponds; and
a memory access block operably coupled to the hierarchical validity database, wherein the memory access block receives memory access requests corresponding to the memory, wherein the memory access block verifies validity of data in the memory corresponding to memory access requests using the hierarchical validity database.

20. The core logic block of claim 19, wherein when the memory access block determines that data in the memory for a memory access request is invalid, the memory access block issues a cache coherency query to at least one memory client.

21. The core logic block of claim 20, wherein the memory access block updates the hierarchical validity database in response to at least a portion of write commands received corresponding to the memory.

22. The core logic block of claim 19, wherein the hierarchical validity database further comprises a top level, wherein the top level includes a plurality of bits, wherein each bit of the plurality of bits included in the top level indicates validity of a corresponding division of the memory, wherein each division of the memory includes a plurality of sections of the memory.

23. The core logic block of claim 22, wherein each level of the hierarchical validity database is stored in a corresponding cache structure within the core logic block.

24. The core logic block of claim 23, wherein each cache structure within the core logic block includes a primary cache and a second cache, wherein the secondary cache stores a portion of data stored in the primary cache.

25. A method for data coherency maintenance, comprising:
receiving a memory access request;
determining validity of data in a memory corresponding to the memory access request using a hierarchical validity database, wherein the hierarchical validity database includes;
a first level, wherein the first level stores a plurality of lines, wherein each line of the plurality of lines in the first level corresponds to a division of a memory, wherein each line of the plurality of lines in the first level includes a plurality of bits and a division address, wherein the division address indicates to which division of the memory the line corresponds, wherein each bit included in each line within the first level indicates validity of a section of the division to which the line corresponds; and
a second level, wherein the second level stores a plurality of lines, wherein each line of the plurality of lines in the second level corresponds to a section of the memory, wherein each line of the plurality of lines in the second level includes a plurality of bits and a section address, wherein the section address indicates to which section of the memory the line corresponds, wherein each bit included in each line within the second level indicates validity of a subsection of the section to which the line corresponds;
when validity of the data is confirmed, allowing the memory access request to proceed; and
when validity of the data is not confirmed, issuing at least one cache coherency query to at least one client of a plurality of clients.

26. The method of claim 25 further comprises:
when an invalidate command is received from one of the plurality of clients, modifying the hierarchical validity database to reflect information in the invalidate command.

27. The method of claim 25 further comprises;
when a write command is received that writes data to the memory, updating the hierarchical validity database to reflect validity of the data written to the memory.

28. The method of claim 25, wherein the hierarchical validity database further comprises a top level, wherein the top level includes a plurality of bits, wherein each bit of the plurality of bits included in the top level indicates validity of a corresponding division of the memory, wherein each division of the memory includes a plurality of sections of the memory.

29. The method of claim 28, wherein determining validity of data in the memory further comprises successively checking each level in the hierarchical validity database, wherein successively checking progresses from the top level to the first level and then to the second level.

* * * * *